Dec. 22, 1936.  C. H. HELLYAR  2,065,221
LAPPING DEVICE
Original Filed April 11, 1928
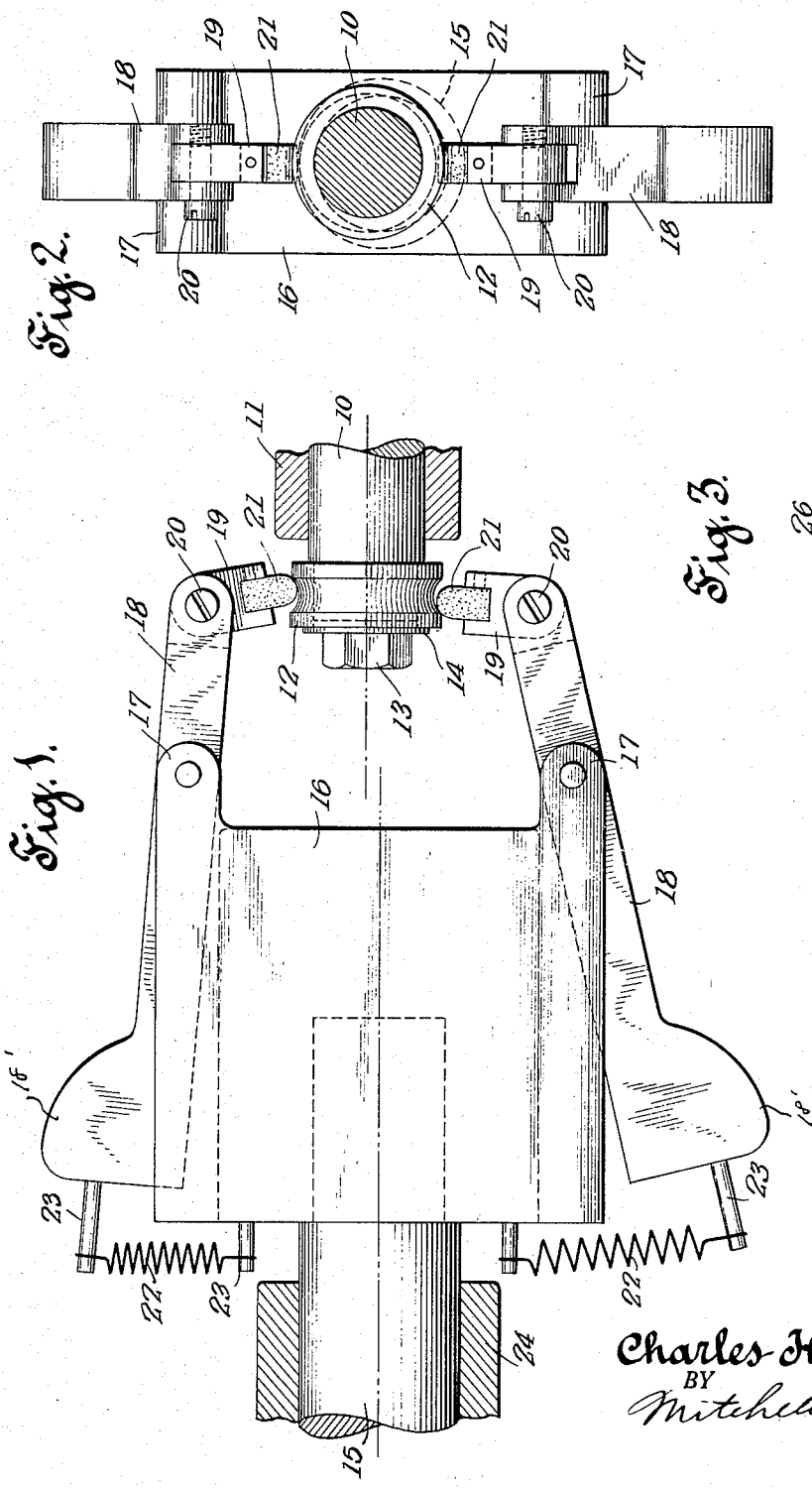
INVENTOR.
Charles H. Hellyar
BY Mitchell & Bechert
ATTORNEYS.

Patented Dec. 22, 1936

2,065,221

UNITED STATES PATENT OFFICE 2,065,221

LAPPING DEVICE

Charles Henry Hellyar, New Britain, Conn., assignor to The Fafnir Bearing Company, New Britain, Conn., a corporation of Connecticut Application April 11, 1928, Serial No. 269,108
Renewed December 29, 1932

12 Claims. (Cl. 51—73)

This invention relates to an improved method of and apparatus for lapping annular surfaces, and is particularly useful in connection with lapping operations on races for antifriction balls or rollers.

An object of the present invention is to provide a lapping device or machine of simple form and especially adapted to quickly and completely lap surfaces of revolution such as those forming the raceways for the antifriction members of a bearing.

This object is attained in my invention by an arrangement whereby the lapping tool moves in an advancing spiral relative to the axis of rotation of the work. Other objects and features of the invention will be apparent on reading of the specification.

In the accompanying drawing annexed hereto and forming a part of this specification I have shown my invention embodied in simple forms especially adapted for lapping the inner and outer grooved raceways of ball-bearings, but it will be understood that the invention can be otherwise embodied and that the drawing is not to be construed as defining or limiting the scope of the invention, the claims appended to this specification being relied upon for that purpose.

In the drawing—

Fig. 1 is a longitudinal view of a form of the invention adapted for the inner raceway of an antifriction bearing;

Fig. 2 is an end view of the parts shown in Fig. 1; and

Fig. 3 is a fragmentary view of another form of the invention adapted for the outer raceway of an antifriction bearing.

In the above mentioned drawing I have shown two embodiments of the invention which are now deemed preferable, but it is to be understood that changes and modifications may be made within the scope of the appended claims without departing from the spirit of the invention.

Briefly, and in its preferred aspect my invention includes the following principal parts: First, means for rotating the work piece to be lapped; second, a rotatable member; third, a lapping tool pivotally connected to said rotating member; and fourth, means for causing said lapping tool to move automatically in contact wth the work piece in an advancing spiral relatively to the axis of rotation of the work piece. In the preferred from of the invention shown in the drawing this fourth mentioned means consists in providing non-aligned bearings for the rotatable member and the work piece and in weighting the lapping tool so that it will be urged toward the work piece by centrifugal force.

Referring more in detail to the figures of the drawing, I provide a spindle 10 rotatable in suitable bearings 11 shown fragmentarily in Fig. 1. On this spindle 10 is adapted to be mounted the article 12 having a surface to be lapped. In the form of the invention shown in this figure the article 12 to be lapped forms the inner ring of an antifriction bearing, the raceway therein being lapped uniformly about its entire engaging surface. The inner ring 12 may be secured directly to the end of the spindle 10 by a cap screw 13 and washer 14 accurately in alignment with the axis of the spindle 10.

A second spindle 15 adapted to be rotated about an axis preferably parallel to and adjacent or out of alignment with the first spindle 10, is provided with a head 16 thereon having lugs 17 diametrically opposed to each other. These lugs 17 form the pivotal mountings for the intermediate portions of arms 18 having at one end a lapping tool 19 fixed thereto by any suitable attaching means such as the cap screw 20 shown in Figs. 1 and 2. The lapping tools 19 may have inserted therein materials 21 such as leather, wood or soft metal adapted to be charged with a suitable abrasive in finely comminuted form. The opposite ends of these arms 18 are weighted preferably by being enlarged as at 18' so that when the head 16 and spindle 15 are rotated rapidly these weighted portions will tend to fly outwardly, thus oscillating the arms 18 about their pivots and forcing the lapping tools 19 firmly into contact with the surface to be lapped.

In order to facilitate convenient removal of articles 12 to be lapped light spring members 22 are interposed between pins 23 respectively mounted on a face of the member 16 and beyond the weighted portions of the arms 18. When the member 16 is not being rotated at sufficient speed the effect of these springs 22 will be to move the weighted portions of the arms 18 inwardly and thus retract the lapping tools 19 from engagement with the article 12 being lapped. The spindle 15 is rotatable within a bearing 24 so that spindle 15 rotates about a fixed axis, this axis as shown clearly in Fig. 1 being parallel to the axis of spindle 10.

In Fig. 3 a modified form of the invention is shown adapted for lapping the raceway of an outer ring 25 of an antifriction bearing. In this modification the arms 26 one of which only is shown, are pivotally mounted at one end to a member 27 adapted to be rotated about an axis out of alignment with and preferably closely parallel with the axis of rotation of the article 25 being lapped. At their opposite ends these arms 26 are provided with lapping tools 28 generally similar to those shown in Figs. 1 and 2, the intermediate portions of these arms 26 are enlarged or otherwise weighted so that when they are rapidly rotating the centrifugal force will tend to urge the lapping tools 28 outwardly and firmly into contact with the surface to be lapped. Springs 29 interposed between pins 30 on the front face of the rotating member 27 and the arms 26 effect movement of the arms 26 towards the axis of rotation, when rotation of the member 27 is stopped. The article 25 being lapped may then be readily removed. It will be understood that the article 25 is secured coaxially to a spindle 31 rotatable about a fixed axis in a bearing not shown. Also the member 27 carrying the arms 26 is rotatably mounted in a suitable bearing not shown. The axes of rotation of the member 27 and of the spindle 31 are preferably parallel to each other.

In operation and during rotation of the articles 12 and 25 the members 16 and 27 are rotated. This revolves the arms 18 and 26 which are free to oscillate about their point of attachment to the members 16 and 27. As the axes about which the articles 12 and 25 and the members 16 and 27 rotate are out of alignment, the arms 18 and 26 will be caused to oscillate. This oscillatory or back and forth movement of the arms 18 and 26 causes the tools 19 and 28 to zigzag across the raceway groove and thus move in substantially symmetrical advancing spirals over the surfaces being lapped. This movement of the tools 19 and 28 combined with the rotation of the articles 12 and 25 laps and polishes thoroughly and uniformly the entire surface to be lapped since the tool as it proceeds around and around the surface being lapped has a plus or minus advance relatively to its previous course around said surface instead of tracking in the same course. As a result when the operation has been continued for a sufficient period the entire surface will have been uniformly lapped.

I claim:

1. A lapping device comprising in combination, a spindle adapted to support and rotate an article to be lapped about a fixed axis, a lapping tool mounted upon a pivoted member, means to revolve said pivoted member about an axis out of alignment with said spindle supporting said article, and a weight on said pivoted member forcing said lapping tool into contact with said article when said pivoted member is revolved.

2. A lapping machine comprising in combination, a spindle adapted to support and rotate an article to be lapped about a fixed axis, a lapping tool mounted upon a pivoted member, means to revolve said pivoted member about an axis adjacent and parallel to said spindle supporting said article, and means to cause said pivoted member to force said lapping tool into contact with said article when said pivoted member is revolved.

3. A lapping device comprising a pivotally mounted lapping tool, means for rotating a work piece to be lapped, means for causing the pivot of said lapping tool to move eccentrically to the axis of rotation of the work piece, and means for causing said lapping tool to move automatically in contact with the work piece in an advancing spiral relatively to the axis of rotation of the work piece.

4. A lapping device comprising a rotatable member, a lapping tool pivotally connected to said member, means for rotating a work piece to be lapped, and means for causing said lapping tool to oscillate automatically back and forth against the face to be lapped in an advancing spiral relatively to the axis of rotation of the work piece when said rotatable member is rotated.

5. A lapping device comprising a rotatable member, a lapping tool pivotally connected to said member, means for rotating a work piece to be lapped, means for causing the pivot of said lapping tool to move eccentrically to the axis of rotation of the work piece, and means for causing said lapping tool to move automatically in contact with the work piece in an advancing spiral relatively to the axis of rotation of the work piece when said rotatable member is rotated.

6. A lapping device comprising a rotatable member, a lapping tool pivotally connected to said member, means operated by centrifugal force for holding said lapping tool in contact with a work piece to be lapped when said rotatable member is rotated, means for rotating the work piece about a different axis from that of the rotatable member for causing the pivot of said lapping tool to move eccentrically to the axis of rotation of the work piece, whereby when said rotatable member is rotated said lapping tool is automatically oscillated back and forth in an advancing spiral relatively to the axis of rotation of the work piece and without changing the direction of rotation of either rotatable part.

7. A lapping device comprising a rotatable member, a lapping tool pivotally connected to said member, means for rotating the work piece to be lapped, the axis of rotation of the work piece being out of alignment with the axis of rotation of said rotatable member, and means for holding said lapping tool in contact with the work piece, whereby when said rotatable member is rotated said lapping tool is automatically moved in an advancing spiral relatively to the axis of rotation of said work piece.

8. A lapping device comprising a rotatable member, a lapping tool pivotally connected to said member, means for rotating a work piece, the axis of rotation of the work piece being out of alignment with the axis of rotation of said rotatable member, and a weight on said lapping tool forcing said tool into contact with the work piece when said rotatable member is rotated.

9. A lapping device comprising a head rotatable about one axis, a lapping tool pivotally mounted on said head, means for supporting a work piece to be lapped, said means being rotatable about another axis substantially parallel to the axis of said head to cause said lapping tool to oscillate automatically across the face of that part of the work piece to be lapped without changing the direction of rotation of either rotatable part.

10. A machine for lapping the surface of a circumferential groove in an annular body, comprising a rotatable head, a lapping tool holder, means for connecting said holder to said head for both oscillating and to and fro movement of said holder, rotatable means for supporting an annular body with its circumferential groove facing said tool holder, the axis of rotation of the tool support and the annular body support being offset and substantially parallel, whereby a lapping tool carried by said holder will lap the surface of said groove by traveling around and across the same in a progressively advancing spiral course as said holder and support are rotated relatively to each other.

11. The method of lapping a surface, which comprises pivoting a lapping tool about an axis, rotating the tool about a second axis at an angle to the first axis, positioning a work piece to contact with the tool and to move the tool on the first axis while rotating the tool about the second axis.

12. A lapping device comprising in combination a spindle adapted to support and rotate about a fixed axis an article to be lapped, a lapping tool, a member pivoted intermediate its length on one end of which said tool is mounted, means to revolve said pivoted member about an axis out of alignment with said spindle supporting said article, the weight of the end of said member opposite the lapping tool being sufficient to hold said lapping tool in contact with said article to be lapped when said member is revolved on its own axis.

CHARLES HENRY HELLYAR.